2,976,161

GLASS BATCHES AND METHOD OF PREPARATION

Rowland D. Smith, Corning, N.Y., assignor to Corning Glass Works, Corning, N.Y., a corporation of New York No Drawing. Filed Nov. 2, 1956, Ser. No. 619,939

10 Claims. (Cl. 106—47)

This invention relates to the preparation of glass batches in which glass cullet, that is glass previously melted and returned as waste glass, is a major batch constituent. It is particularly concerned with glass batches of this type in which the glass cullet employed is partially deficient in one or more necessary glass making materials which must therefore be introduced into the batches in compensating amounts.

It is well recognized that a minor proportion of glass cullet in a batch, that is on the order of 10 to 30%, functions in the nature of a flux material and markedly increases the ease and rate of glass melting. Also an obvious raw material economy results from using this waste glass. Accordingly, glass cullet is employed as a batch material whenever possible.

In recent years, however, glass-forming methods and machines have come into use which utilize, for the production of glass articles, only a relatively small portion of the molten glass fed to them. This has resulted in large returns of glass cullet and, consequently, the compounding and melting of glass batches having considerably larger cullet to batch ratios. In the operation of some glass melting units, for example, it is now conventional practice to employ glass batches containing from 70 to 90% cullet.

Earlier experience with batches having low cullet ratios indicated that increasing the amount of cullet would further facilitate melting and that high cullet ratio batches should melt with relative ease. Actual results encountered in commercial melting practice have been completely contrary to such expectations, however. In fact, it has frequently been found that the time required to satisfactorily melt a glass batch containing cullet as a major constituent is as long as, or even longer than, that required to melt a corresponding batch composed entirely of raw or unmelted batch materials. In other words, the melting rate, that is the rate in pounds per hour at which glass of acceptable quality can be produced in a given melting unit, is often no higher for high cullet batches than for all raw batch. I have now found that the melting rate of glass batches having high cullet ratios can be markedly improved without sacrifice of glass quality by adopting a new method of batch preparation and it is a primary purpose of this invention to provide such a method.

It has also been previously recognized that at least small amounts of certain materials are volatilized or otherwise lost from a glass batch during melting and that many fining agents decompose or otherwise lose their effectiveness during the melting process. Thus alkali metal oxides, boric oxide and colorants such as copper oxide may volatilize during melting, whereas fining agents such as sodium chloride, sodium sulphate, and antimony oxide may decompose or be chemically altered during the melting process and hence be incapable of producing appreciable fining action during remelting. In accordance with prior practice, the materials in the new or raw portion of a glass batch have been so proportioned as to compensate for deficiencies in the cullet used. In the case of fining agents complete compensation is generally unnecessary or even impractical, and the amount normally required for the raw batch ingredients is often considered sufficient, since the cullet material has already been fined during its previous melting.

I have found that cullet, when it is a major batch constituent, tends to become segregated from the raw batch materials and, as a result, tends to produce inhomogeneous glass during melting. This results in either producing large amounts of reject ware or slowing the melting rate of the glass down to the rate of the slowest melting or fining portion of the glass in the tank or other melting unit. I have further found that this situation can be largely remedied by incorporating fining agents and other compensating materials directly with the glass cullet rather than as part of the raw or previously unmelted portion of the glass batch.

Accordingly, my invention resides in a method of preparing a batch for the melting of glass, wherein glass cullet is a major constituent of the batch and the cullet is deficient in a necessary glass making material, which includes the step of applying to the surfaces of the glass cullet particles, prior to introducing them into the batch, a coating containing the deficient material, and in glass batches prepared in accordance with this method. Preferably the material is applied to the cullet in the form of an aqueous solution and dried to form a surface film or layer prior to introducing the cullet into a glass batch.

The deficient material, or solution thereof, may be applied in accordance with any conventional coating procedure. One convenient method is to spray a solution on the cullet as it is being carried on a conveyor to a storage place. Alternatively, the cullet may be dumped into, or passed through, a bath of the coating solution. Where the cullet is taken directly from a forming machine or melting tank overflow, it is often possible to apply the coating material while the cullet is still hot, thus eliminating the problem of drying. Otherwise care must be taken to dry the wetted cullet in order to form an adherent film of coating material and to avoid the necessity of evaporating water when the batch fill or charge is added to a melting unit. The coating material used may be any soluble compound of the glass constituent in which the cullet is deficient.

The present invention is particularly advantageous as a means of improving glass fining by incorporating a fining agent in the cullet portion of the batch. The particular fining agent employed will be that customarily used in melting of the glass. Sodium chloride and sodium sulphate exemplify widely used fining agents which may be readily applied in aqueous solution. The oxides of arsenic and antimony, also extensively used for fining, may be applied in the form of certain soluble salts embodying these oxides. Where it is undesirable to use such salts, these oxides may be applied successfully in the form of a suspension or slurry, although, where a suspension is used, care must be taken to insure that the material is well mixed and uniformly applied.

Other materials which may conveniently be added in accordance with the present invention are glass fluxes such as the alkali metal oxides and boric oxide which form numerous water soluble salts. Also colorants such as copper oxide may be added in the form of soluble salts such as copper nitrate.

The amount of material to be applied in any given situation will depend on the amount required by the particular glass cullet being remelted and may be determined in accordance with conventional practices in the compounding of glass batches. Where a fining agent is being added, the optimum amount may vary slightly with different glasses and melting units, and some melting experience with a particular set of conditions may be required to determine an optimum amount. In any event the amount of fining agent added should not exceed that used in a corresponding batch composed entirely of raw materials and ordinarily will be much less. In general it may be said that the amount of fining agent added to the raw batch materials, plus that applied to the cullet in accordance with the present method, should exceed but slightly, if at all, the optimum amount which would be used in a corresponding batch compounded in accordance with prior batch mixing practices. In other words, so far as fining agents are concerned the present method does not involve the use of any substantial additional fining agent, but rather is more concerned with its distribution or location in the tank fill. The concentration of material on the cullet can be largely controlled by correspondingly controlling the concentration of the solution applied.

The present invention finds particular application where the cullet proportions of the batch exceed 50%. With smaller cullet ratios there appears to be little tendency for batch cullet segregation to occur and hence material compensations can conveniently be made by suitably varying the proportions of the raw batch ingredients. In batches containing more than 50% cullet, however, melting and fining of the glass batch becomes increasingly difficult and has heretofore tended to become slower as the cullet ratio increases, rather than faster as would normally be expected.

The melting rate of a glass, that is the rate at which glass of acceptable quality is produced, may be dependent on various factors. However, a major factor, and frequently the controlling one, is the fining rate, that is the rate at which glass is brought to a molten state in which its content of seeds or gas bubbles is within a predetermined acceptable limit. Accordingly, it is common practice to utilize seed counts, as a basis for studying and comparing glass melting rates. In determining such data experimentally a sample of glass batch is melted in a crucible or other suitable container at a predetermined temperature and for a predetermined length of time. The melt is then cooled and the number of seeds found in a selected volume of glass counted.

By way of illustrating that the intimate association of an adequate amount of fining agent with glass cullet produces improved fining or seed removal when glass is melted from batches containing such cullet as a major constituent, crucible melts have been made from both coated and uncoated cullet batches. The data in the table below are seed counts in cubic centimeter samples of glass taken from comparative melts at various cullet levels which differed only in that the cullet used in one set was coated with an excess of salt cake or sodium sulfate as a fining agent whereas in the other set the cullet was uncoated and the batch was prepared in accordance with conventional commercial practice.

| Percent Cullet | Seeds/cc. | |
| --- | --- | --- |
| | Uncoated Cullet | Coated Cullet |
| 75 | 707 | 3 |
| 90 | 1,327 | 182 |
| 95 | 1,678 | 570 |
| 100 | 1,377 | 341 |

The glass used in obtaining the above data is a conventional commercial lime glass which was selected because fining is more frequently the controlling factor over melting rates in glasses of this type which have relatively low melting temperatures. The particular glass selected is normally tank melted with approximately 0.7% sodium sulfate or salt cake added to the raw batch materials as a fining agent. In preparing coated cullet for the test melts noted above, cullet particles were wetted with an aqueous solution of sodium sulfate and dried prior to mixing with raw batch materials. The data presented in the table represent the number of seeds remaining in a cubic centimeter of glass after the batch had been melted for 80 minutes at 1450° C.

It will be appreciated that in commercial practice as contrasted to experimental crucible melting, an excess of fining agent is highly undesirable from many standpoints. Hence in tank melting the normal proportion of fining agent in the fill would be maintained by deleting from the raw batch an amount of fining agent equivalent to that applied to the cullet.

The present invention is of particular value in those instances where it is desirable to melt an all-cullet batch, that is, a batch containing no raw materials portion in which material compensation can be made. Frequently it is desirable to use a relatively low cullet proportion in regular glass melting practice, which does not utilize all of the cullet returned. Also cullet accumulates from special glasses which are melted only infrequently and in small melts, and ability to melt an all-cullet batch can represent considerable economy by reducing such accumulations. Any attempt to add compensating amounts of materials or effective amounts of fining agent in solid form to an all-cullet batch creates a most aggravated form of batch segregation and is relatively ineffective. In accordance with the present invention however the cullet can be coated with a suitable fining agent and such other ingredients as may be required to compensate for losses in the original melting process and disposed of by periodically shifting the melting unit to an all-cullet batch.

As an illustration of the melting advantages offered by the present invention in the melting of all-cullet batches, two crucible melts of a commercial borosilicate glass were made in which the batch was composed entirely of cullet. The two batches differed only in that in one case the cullet was uncoated whereas in the other the cullet was wet with a solution of sodium chloride and then dried to provide an excess of fining agent on the cullet prior to being placed in the melting crucible. Both batches were melted for a period of three hours at 1550° C. and cooled after which a seed count was made in accordance with previously described practice. Glass melted from the uncoated cullet had a seed count of over 4000 seeds per cubic centimeter whereas the glass from the salt coated cullet contained considerably less than 100 seeds per cubic centimeter. Subsequently experiments were conducted in a large commercial melting unit with an all-cullet borosilicate batch having a NaCl coating equivalent to the normal proportion of NaCl used as a fining agent in this glass. The experiments, carried on for a period of several days, confirmed that commercial quality glass could be consistently produced by this procedure. Thus the present invention provides a convenient and effective method of melting all-cullet batches and thereby utilizing glass cullet to the best advantage in glass melting.

What is claimed is:

1. In the preparation of a glass batch containing glass cullet particles wherein the cullet is deficient in a necessary glass-making material and an amount of the glass-making material is added to the batch to compensate for the cullet deficiency, the improvement which comprises applying to the surfaces of the glass cullet particles, prior to introducing them into the batch, a coating containing the deficient material.

2. The method of claim 1 in which the coating is applied to the cullet in the form of an aqueous solution and a major portion of the water is evaporated therefrom prior to introducing the cullet into the batch.

3. The method of claim 1 in which the deficient material comprising the coating is one capable of functioning as a fining agent for the glass during the melting process.

4. The method of claim 1 in which the glass batch is composed entirely of glass cullet.

5. In the melting of glass batches containing a fining agent and a major portion of glass cullet, a method of improving the fining rate of the molten glass which comprises applying at least a portion of the fining agent to the surfaces of the glass cullet particles.

6. A glass batch containing as a major constituent glass cullet having applied to the surfaces of its particles a material in which the cullet is deficient for glassmaking purposes.

7. A glass batch containing glass cullet as a major constituent and a fining agent and in which at least a portion of the fining agent is carried on the surfaces of the glass cullet particles.

8. A method of preparing glass cullet for use in a glass batch wherein the cullet is deficient in a necessary glass making material, which includes the step of applying to the surfaces of the glass cullet particles, prior to introducing them into the batch, a coating containing the deficient material.

9. The method of claim 8 in which the coating is applied to the cullet in the form of an aqueous solution and a major portion of the water is evaporated therefrom prior to introducing the cullet into the batch.

10. In a method of preparing a glass batch consisting of at least one component selected from glass cullet and a mixture of unmelted glass making materials wherein the cullet constitutes at least 50% of the batch and wherein the cullet is deficient in a necessary glass making material, the step of applying to the surfaces of the glass cullet particles, prior to introducing them into the batch, a coating containing the deficient material.

References Cited in the file of this patent

UNITED STATES PATENTS

| | | |
|---|---|---|
| 2,434,281 | Moulton | Jan. 13, 1948 |
| 2,473,958 | Kreidl | June 21, 1949 |

FOREIGN PATENTS

| | | |
|---|---|---|
| 576,579 | Great Britain | Apr. 10, 1946 |

OTHER REFERENCES

Handbook of Glass Manufacture, 1953, Tooley, published by Ogden Publishing Company, page 253.